No. 811,806. PATENTED FEB. 6, 1906.
R. WALKER.
MIRROR FOR SURGICAL, DENTAL, AND LIKE USES.
APPLICATION FILED NOV. 24, 1905.
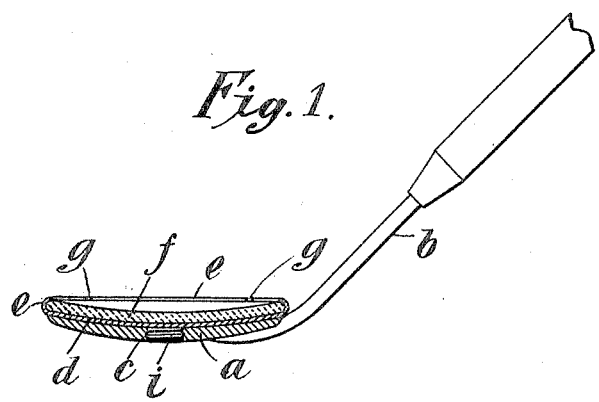
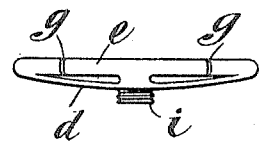
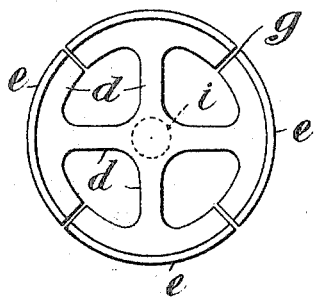
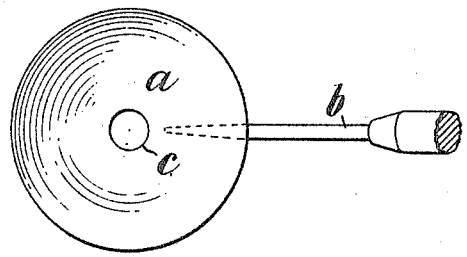
Attest:
Edgeworth Greene
Emily Ott.
Inventor:
Robert Walker
by Redding, Kiddle & Greeley
Attys.

UNITED STATES PATENT OFFICE.

ROBERT WALKER, OF NEWARK, NEW JERSEY.

MIRROR FOR SURGICAL, DENTAL, AND LIKE USES.

No. 811,806.

Specification of Letters Patent.

Patented Feb. 6, 1906.

Application filed November 24, 1905. Serial No. 288,831.

*To all whom it may concern:*

Be it known that I, ROBERT WALKER, a British subject, formerly residing in the city of London, England, now residing in the city of Newark, in the county of Essex, in the State of New Jersey, have invented certain new and useful Improvements in Mirrors for Surgical, Dental, and Like Uses, of which the following is a specification, reference being had to the accompanying drawings, forming a part hereof.

Mirrors for surgical, dental, and other like uses are not only subject to moisture in use, but must be thoroughly sterilized after use. The reflecting-surface of the mirror should be protected as much as possible while in use against moisture, lest it should be injured, and at the same time the mirror must be capable of being taken apart readily in order that it may be thoroughly sterilized in every part, as well as that the reflecting-surface of the mirror may be quickly and thoroughly dried after use.

It is the object of this invention to attain these results by means which are simpler and more efficient than the means heretofore proposed for the purpose, and in accordance with the invention the mirror proper is mounted in a spring-grip frame so constructed that it is caused to bind and hold the mirror proper tightly, while the mirror proper can be readily disengaged therefrom.

The invention will be more fully explained hereinafter with reference to the accompanying drawings, in which it is illustrated as embodied in a simple and convenient construction, and in which—

Figure 1 is a view in sectional elevation of a mirror constructed in accordance with the invention. Fig. 2 is an edge elevation of the spring-grip frame by itself. Fig. 3 is a plan view of the spring-grip frame. Fig. 4 is a plan view of the supporting back plate, a portion of the handle being shown and the other parts being removed.

In the embodiment of the invention represented in the drawings a suitable handle $b$ is shown as having secured thereto at its end in convenient position a support or back plate $a$, which is preferably dished or concaved on its upper surface, as shown. The plate $a$ is adapted to be engaged by the spring-grip frame, hereinafter described, and for this purpose may be provided centrally with a threaded hole, as at $c$. The spring frame or holder $d$ is preferably a skeleton frame, as shown, having its edge or rim $e$ slightly turned over, as shown, to confine the mirror proper, $f$, when in use, as clearly represented in Fig. 1. The frame or holder is preferably split, as shown at $g$, to make the holder more flexible, the divisions so formed being equidistant and of any convenient number. The frame or holder is also provided with means, such as a screw-threaded stud $i$, to engage the back plate or support $a$ and be secured thereto.

In assembling the parts the mirror proper, $f$, is placed in the frame $d$, and the latter is secured to the back plate or support $a$ by means of the screw-threaded stud $i$. As the frame is screwed firmly down upon its concaved seat on the plate $a$ the rim $e$ thereof is caused to grip tightly the edge of the mirror $f$ and to hold it firmly in position. The slits $g$ are practically closed at the same time, and as the rim of the frame or holder is drawn tightly against the plate or support $a$ practically no moisture can find its way to the reflecting-surface of the mirror proper. Upon disengaging the frame or holder from the support the mirror proper is immediately released, and all parts can be thoroughly sterilized and quickly dried, so that no injury can come to the reflecting-surface.

I claim as my invention—

1. In a mirror-holder, the combination of a concaved back plate or support and a spring frame or holder adapted to be engaged with and drawn into the support and simultaneously grip the mirror, substantially as described.

2. In a mirror-holder, the combination of a concaved back plate or support and a spring frame or holder having its edge formed to engage the mirror and itself adapted to engage and be drawn into the back plate or support whereby the mirror is simultaneously gripped by the frame, substantially as described.

3. In a mirror-holder, the combination of a concaved back plate or support and a spring-frame having its edge turned over to grip the mirror and itself provided centrally with a stud to engage the back plate or support, whereby the frame is simultaneously caused to grip the mirror, substantially as described.

4. In a mirror-holder, the combination of a concaved back plate or support and a spring frame or holder having its edge turned over to engage the mirror and provided centrally with a screw-threaded stud to engage the back plate or support, substantially as described.

This specification signed and witnessed this 22d day of November, 1905.

ROBERT WALKER.

In presence of—
HOMER H. SNOW,
M. A. BARRETT.